United States Patent
Keisu

(10) Patent No.: US 9,148,338 B2
(45) Date of Patent: Sep. 29, 2015

(54) BASE STATION AND METHOD FOR REMOTE MANAGEMENT IN A CELLULAR COMMUNICATION NETWORK

(75) Inventor: Torbjorn Keisu, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 13/530,448

(22) Filed: Jun. 22, 2012

(65) Prior Publication Data

US 2012/0329511 A1    Dec. 27, 2012

Related U.S. Application Data

(60) Provisional application No. 61/506,204, filed on Jul. 11, 2011.

(30) Foreign Application Priority Data

Jun. 23, 2011    (EP) ..................................... 11171119

(51) Int. Cl.
*H04B 7/00*     (2006.01)
*H04L 12/24*    (2006.01)
*H04W 24/04*    (2009.01)

(52) U.S. Cl.
CPC ........ *H04L 41/0672* (2013.01); *H04L 41/0806* (2013.01); *H04W 24/04* (2013.01)

(58) Field of Classification Search
CPC ..... H04W 88/00; H04W 24/00; H04W 16/24; H04W 84/08; H04W 4/00; H04W 8/26; H04W 88/14; H04W 88/12; H04W 76/02; H04W 92/02; H04W 88/181
USPC .............. 455/422.1, 436, 433, 550, 507, 517, 455/524, 550.1, 552.1, 560, 561
See application file for complete search history.

(56) References Cited

U.S. PATENT DOCUMENTS

| | | | |
|---|---|---|---|
| 6,904,024 B1 * | 6/2005 | Boch et al. | 370/310.1 |
| 7,483,436 B2 * | 1/2009 | Semper | 370/395.52 |
| 2007/0155375 A1 * | 7/2007 | Kappel et al. | 455/422.1 |
| 2012/0309395 A1 * | 12/2012 | Centonza et al. | 455/436 |

FOREIGN PATENT DOCUMENTS

| | | |
|---|---|---|
| WO | WO 01/93615 A1 | 12/2001 |
| WO | WO 02/21778 A1 | 3/2002 |

* cited by examiner

*Primary Examiner* — Nhan Le

(57) ABSTRACT

The present disclosure relates to a base station and a method for Operation and Maintenance, OaM, communication in a communication system. The base station comprises a first interface configured to communicate with a core network, including OaM communication, and a second interface configured for OaM communication. The second interface is arranged to communicate wirelessly with the core network via another base station. The base station and the method facilitates troubleshooting remote management problems in OaM communication.

16 Claims, 3 Drawing Sheets

BASE STATION AND METHOD FOR REMOTE MANAGEMENT IN A CELLULAR COMMUNICATION NETWORK

CROSS-REFERENCE TO RELATED APPLICATIONS

This application claims the benefit of European Patent Application Number EP 1,1171,119, filed on Jun. 23, 2011, and U.S. Provisional application No. 61/506,204, filed Jul. 11, 2011, the disclosures of which are fully incorporated herein by reference.

TECHNICAL FIELD

The embodiments described herein relate to a base station for a cellular communication network and a method for Operation and Maintenance communication in a base station.

BACKGROUND

Management of a base station in a cellular communication network, from another location than where the base station is physically located, can presently be provided through a network interface also used for payload and control signalling, or through a dedicated management interface, in the base station. This is often called "remote management" and the interface provided and employed in the base station for remote management will in the following be referred to as "remote management interface". To be able to enable an interface for remote management of a base station, typically a number of measures are required that potentially can go wrong and thus effectively prevent any remote management of the base station.

Typically, the only way to re-connect to a base station that due to an error has not been able to activate its remote management interface is to physically visit the base station and restart or reconfigure the same. This of course is time consuming, labour intensive and therefore expensive, which is a drawback.

Hence, there is a need to overcome at least the drawback mentioned above.

SUMMARY

It is an object to provide a base station and method which obviate at least the above mentioned drawback.

The above stated object is achieved by means of a base station and method according to the independent claims and by the embodiments according to the dependent claims.

A first embodiment provides a base station for a cellular communication network. The base station comprises a first interface configured to communicate with a core network, including Operation and Maintenance (OaM) communication, and a second interface configured for OaM communication. The second interface is arranged to communicate wirelessly with the core network via another base station.

A second embodiment provides a method for OaM communication in a base station comprised in a cellular communication network. The base station comprises a first interface configured to communicate with a core network, including OaM communication, and a second interface configured for OaM communication. The method comprises establishing contact with the core network via the second interface configured for OaM communication, wherein the second interface is arranged to communicate wirelessly with the core network via another base station.

An advantage of certain embodiments described herein is that they provide OaM communication including remote management of base stations by means of an overlaid network. Herein, by the term "overlaid" is meant that a base station in one cellular communication network has a radio coverage area that overlaps with another radio coverage area of another base station in another cellular communication network, or with another radio coverage area of another base station of the same cellular communication network. An example of an overlaid network is a combination of macro base stations overlapping micro base stations. Overlaid networks may for example be any one of Global System for Mobile communications (GSM) Radio Access Network (RAN), Wideband Code Division Multiple Access (WCDMA) RAN and Long Term Evolution (LTE) RAN.

Problems related to OaM communication for instance due to malfunctioning of the first interface can be solved using a remote management option relying on the overlaid network. In many cases all that is necessary is to restart the base station partly or completely via the overlaid network. Thus it can be avoided to dispatch a service person, which used to be the only alternative according to the conventional technology discussed above. In many cases, access to base stations require getting hold of property owners, thus resulting in both costly and time consuming waiting for the service person. The solution provided herein is hence very cost effective since dispatch of a service person is no longer required.

Another advantage is that some of the embodiments described herein facilitate initial deployment of a base station to establish configuration parameters without the need of a costly expert person for instance having knowledge of a complete installation process, but only a less experienced service person, to physically visit the base station for initial deployment. In the initial development scenario, the advantage is that an infra structure for initial establishment for configuration is already in place. This simplifies the installation process including initial deployment since all data is fetched from an OaM service center instead of requiring being brought to the base station and implemented by the expert service person.

Further advantages and features of embodiments of the present invention will become apparent when reading the following detailed description in conjunction with the drawings.

DETAILED DESCRIPTION

The present invention will now be described more fully hereinafter with reference to the accompanying drawings, in which different exemplary embodiments are shown. These exemplary embodiments are provided so that this disclosure will be thorough and complete and not for purposes of limitation.

Figure 1A:
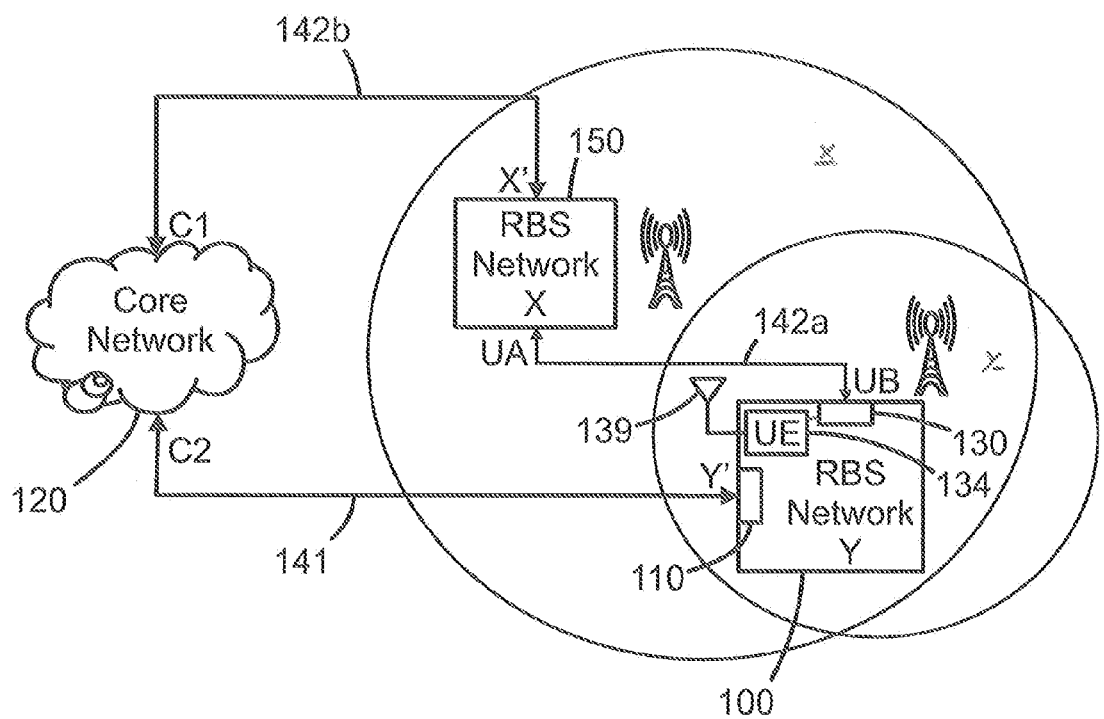
FIG. 1A is a schematic block diagram of a communication system in which an embodiment of this disclosure is implemented.

FIG. 1A illustrates an example of a communication system comprising cellular communication networks in which embodiments of this disclosure may be implemented. The exemplary cellular communication network(s) can be Long Term Evolution (LTE) networks, Global System for Mobile communications (GSM) networks, or WCDMA networks, or any combination thereof. For the sake of simplicity, only those parts of the communication system that are of particular relevance to the embodiments discussed herein are shown. The communication system includes a base station 100, typically a radio base station (RBS), Base Transceiver Station (BTS) a NodeB (NB) or an eNodeB (eNB), serving a cell y of a cellular communication network Y, another base station 150, also typically a BTS, a NodeB (NB) or an eNodeB (eNB), serving a cell x of a cellular communication network X, and a core network 120 connected both to the radio base station 100 and said another radio base station 150.

Herein, the term "radio base station" also includes the term "base station", and vice versa.

Herein, the term "cell" means radio coverage area.

According to an embodiment, the radio base station 100 comprises a first interface 110 configured to communicate with the core network 120, including Operation and Maintenance (OaM) communication and a second interface 130 configured for OaM communication. The second interface 130 is further arranged to communicate wirelessly via radio with the core network 120 via said another radio base station 150. Herein, "wirelessly" means that at least the communication between the radio base station 100 and said another radio base station 150 is wireless. The communication between said another radio base station 150 and the core network can be by wire or wireless e.g. using radio link. The communication between the first interface 110 and the core network 120 is typically by wire, even though also wireless communication e.g. using radio link is possible.

According to an embodiment, the second interface 130 is configured for communication with said another base station 150 over the Uu (between UA-UB in FIG. 1A) communication interface of said another base station 150. Typically, the wireless communication can be provided by a User Equipment device (UE) 134 having an antenna 139. This is only schematically illustrated in this figure, but will be described below in more detail.

According to an embodiment, said another radio base station 150 serves, or in other words, has a radio coverage area, that covers a cell x, which is overlaid a cell y served by the radio base station 100. In this case, both radio base stations 100, 150 belong to the same cellular communication network and operate typically according to the same standard, but the radio base stations 100, 150 have radio coverage areas that partly overlap. Thus, according to this exemplary embodiment, the cellular communication network X and the cellular communication network Y are the same network, but the cell x and the cell y are different cells of the network X/Y. According to another embodiment, it is also possible that the base stations operate on different radio bands, such as 800 MHz vs 2600 MHz.

Alternatively, according to another embodiment, said another radio base station 150 belongs to another cellular communication network X, than the radio base station 100, which belongs to cellular communication network Y. For instance, radio base station 100 can belong to an LTE RAN and said another radio base station 150 can belong to a cellular communication network of another standard such as a GSM RAN.

In the following, an example of a situation that may occur will be described for explaining the exemplary embodiment in operation.

Normally, radio base station 100 uses its first interface 110 for OaM communication via a first communication link 141 between connection points, C2 and Y'. Thus, OaM communication is provided via the same interface 110 as used for payload and control signaling. If an error occurs, or something else happens that causes problems with OaM communication, such that OaM communication is no longer possible via the first interface 110, the only way to re-connect to the radio base station 100 according to prior art would be to physically visit the site and restart or reconfigure the radio base station 100.

However, by using the second interface 130 for OaM communication instead of the first interface 110, for instance when an error occurs as described above, for wirelessly communicating with said another radio base station 150 using a wireless second communication link 142a and then using a third communication link 142b between said another radio base station 150 and the core network 120 for communication with the core network 120 via said another base station 150, it is possible to provide OaM communication and hence continue OaM communication despite OaM communication problems with the first interface 110.

Since today, typically instead of replacing entire networks, operators are deploying other networks, or overlaid networks of the same standard, within the same area of coverage, several networks often co-exist in the same area. These other networks can typically be used as described above, with reference to the various embodiments, for OaM communication in a cost effective way compared to physically visiting the base station 100 for trouble-shooting in case of OaM communication problems, for instance errors preventing communication via the first interface 110.

In particular if these networks are of different standards, for instance GSM and LTE, it is highly unlikely that all base stations within the same area of coverage regardless of standard are disconnected simultaneously. Thus, according to this embodiment, also operation stability can be improved compared to conventional OaM communication.

Figure 1B:
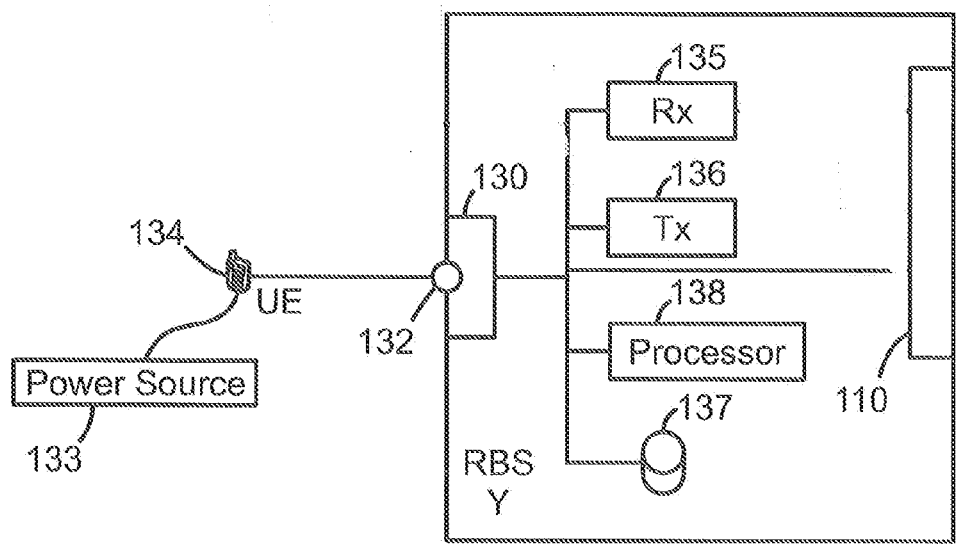
FIG. 1B is a schematic block diagram of a base station according to an embodiment of this disclosure.

Now is referred to FIG. 1B, which is a schematic block diagram of a radio base station according to an embodiment of this disclosure.

As disclosed above, according to an embodiment, the radio base station 100 comprises a first interface 110 configured to communicate with the core network 120, including Operation and Maintenance, OaM, communication. As illustrated, the radio base station 100 comprises receiver circuitry (Rx) 135 and transmitter circuitry (Tx) 136 for wire line or wireless communication with the core network 120. The radio base station 100 further comprises a second interface 130 configured for OaM communication, wherein the second interface 130 is further arranged to communicate wirelessly via radio with the core network 120 via said another radio base station 150.

According to an embodiment, the second interface 130 can be implemented either by means of the UE 134, which is external to the base station 100 or by dedicated hardware, which is internal in the base station 100 and comprises the UE 134. The embodiment with external UE 134 allows already existing base stations to apply embodiments of this disclosure, whereas the embodiment with internal dedicated hardware comprising the UE 134 can be more cost efficient.

According to an embodiment (not illustrated), the second interface 130 can alternatively be arranged to communicate wirelessly with the UE 134 for instance by means of Bluetooth or similar local area wireless network.

Alternatively, the second interface 130 comprises an external port 132 for receiving and communicating with the UE 134. Typically, the external port 132 contains a Universal Serial Bus (USB) interface that can also supply power to the UE 134. Alternatively, the external port 132 is a local management port such as an Ethernet port. In this case, an additional power source 133 is provided. This is a cost-effective solution since often base stations are provided with such a local management port 132. An advantage with both embodiments using external UE 134 is that they can be implemented in existing base stations 100 without changing existing hardware (HW). Typically, any UE 134 can be used, including low-cost devices. If a UE 134 is used to download software (SW), the UE 134 should support data traffic. In addition, the UE 134, with appropriate radio standard/frequency bands depending on environment, can be selected at installation time. Another advantage is that this embodiment also provides simple repair situations since the UE 134 simply can be swapped for a new UE.

According to another embodiment, the second interface 130 comprises a user equipment device, UE, 134 provided as an integrated HW module, or circuit. Alternatively, the integrated HW module, or circuit, is provided on a circuit board (not illustrated). An antenna 139 (See FIG. 1A) is provided since the circuit board itself is shielded. The implementation can be provided similar to a 3G enabled lap top with onboard modules. This solution is more cost efficient and there is no risk for theft.

Typically, the UE 134 supports multiple radio standards and frequencies.

According to an embodiment, the base station 100 is further arranged to detect OaM communication problems of the first interface 110 and is arranged to switch OaM communication to the second interface 130 in such case.

Typically, a Subscriber Identification Module (SIM) card is provided in the UE 134 in order to connect to the another base station 150.

Typically, the OaM service center 225 is comprised in the core network 120.

According to an embodiment (not illustrated), in order for an OaM service center to access the base station 100, via the another base station 150, the IP address of the UE 134, or similar, may be known to the OaM service center. Alternatively SW in the radio base station 100 at the detection of first interface 110 OaM problems may connect by means of using a preconfigured address to the OaM service center. Another alternative is that a phone number to the UE 134 is known by the OaM service center and a connection is established by conventional call procedures.

In the embodiments described above, typically the base station 100 comprises SW to be able to use the UE 134 as a modem. According to an embodiment, the second interface 130 is arranged to communicate with control circuitry 137, 138 for controlling the second interface 130 to operate as a modem. The control circuitry 137, 138 may comprise one or more programmable processors programmed to perform the steps according to FIG. 2 and/or FIG. 3. However, any data processing circuitry or combination of different types of processor(s) 138, and memory 137 that are capable of performing this can be employed.

Figure 2:
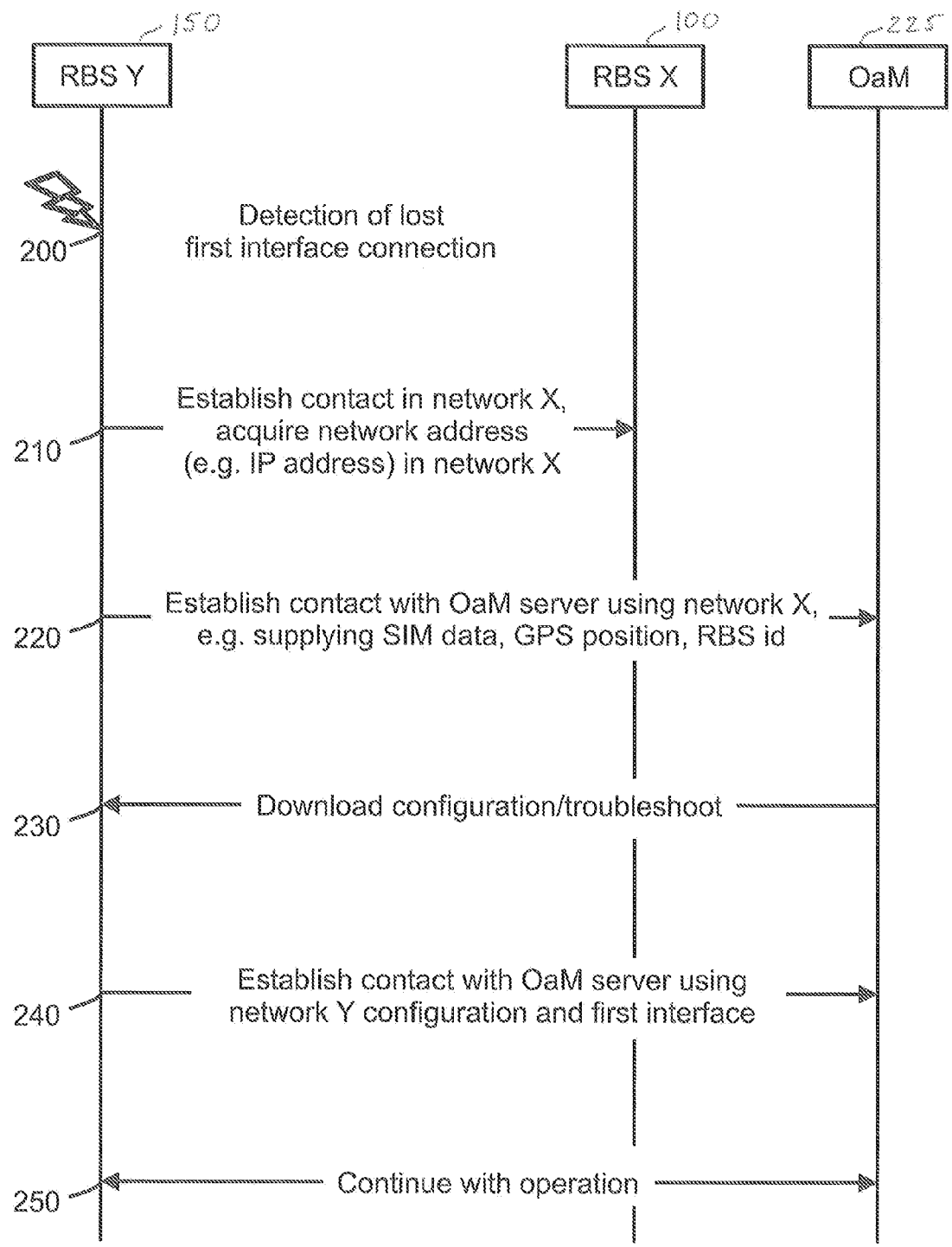
FIG. 2 is a flow diagram illustrating an embodiment of a method for OaM communication in a base station comprised in a cellular communication network.

Now is referred to FIG. 2, which shows a flow diagram illustrating an embodiment of a method in a base station for a cellular communication network. This flow diagram illustrates the operation of the method when a normal operation at the radio base station 100 is subject to OaM communication problems.

In the radio base station 100, lost first interface connection, in particular OaM communication connection or thereto related problems are detected 200. Then, typically if loss of communication is detected, RBS 100 establishes contact 210 through the UE 134 with the core network 120 via the second interface 130 to another radio base station 150 providing cell x of network X in order to obtain a network address, e g an IP address for the UE 134. Then the RBS 100 establishes contact 220 with the OaM service center 225, e g an OaM server there, via RBS 150 in cell x of network X and supplies for instance SIM data for the UE 134, GPS position of RBS 100, RBS identity (RBS id) of RBS 100 etc to the OaM service center 225, e g to the OaM server. Then troubleshooting lost first interface connection is performed 230 from the OaM service center 225 via the second interface 130. This may e g be to restart the local interface 110 in RBS 100 or to ping the core network interfaces in order to locate the problems. As a result of the troubleshooting, configuration information or data may be downloaded 230 from the OaM server 225. Restart of RBS 100 is one measure that can be taken. Log files from the troubleshooting may also be uploaded to the OaM server 225 via the second interface 130. Then RBS 100 (re)establishes contact 240 with the OaM server 225 via the first interface 110. Then operation can be performed, or continued 250 as before the first interface connection was lost, via the first interface 110.

Now is once again referred also to FIG. 1A.

Normally, radio base station 100 is using its first interface 110 for OaM communication. By deploying a UE 134 connected to the radio base station 100 a wireless connection can be established between the UE 134 and the another radio base station 150. In this situation the radio base station 100 may act similar to a Personal Computer (PC) through the UE 134. By using the UE 134, the radio base station 100 may establish an OaM connection via the second wireless link 142a to the another radio base station 150 and then using the third communication link 142b between said another radio base station 150 and the core network 120. Thus, if there are any problems with either the first interface 110, or between the radio base station 100 and the OaM service center 225 in the core network 120, then a backup OaM communication link, made up of the second wireless link 142a and the third communication link 142b, can be used instead. The OaM communication link 142a, 142b via said another base station 150 can also be left always on in order to speed up recovery procedures, or alternatively a configurable time-out value for instance from detection 200 can be used before establishing contact 210. If the functioning of the first interface 110 fluctuates the timeout can be used to ensure that the problems on the first interface 110 are persistent and that a recovery via the second interface 130 is needed before activating the second interface 130.

Figure 3:
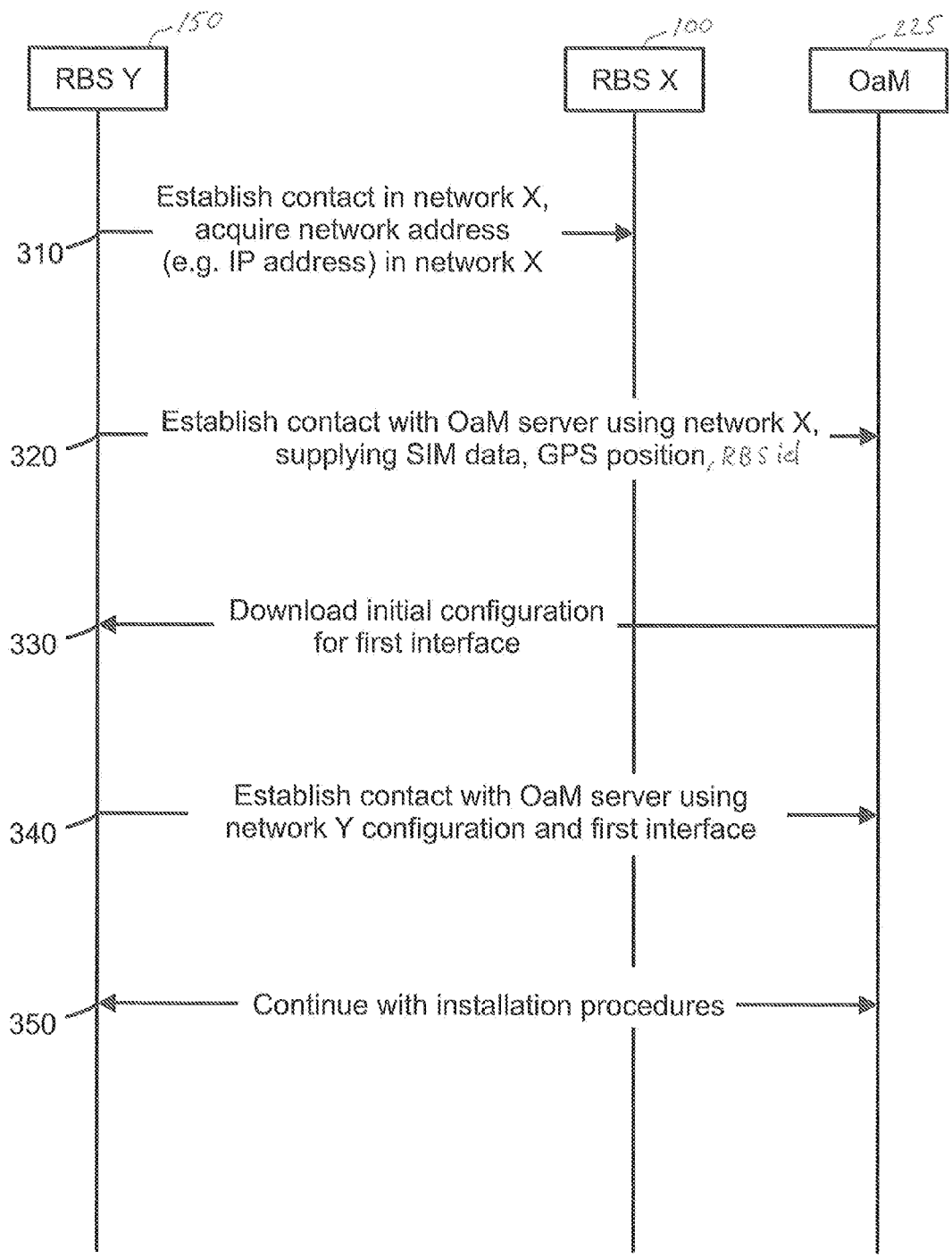
FIG. 3 is a flow diagram illustrating another embodiment of a method for OaM communication in a base station comprised in a cellular communication network.

Now is referred to FIG. 3, which shows a flow diagram illustrating an embodiment of a method for OaM communication in a base station comprised in a cellular communication network. This flow diagram illustrates a procedure for initial deployment of the base station 100.

At initial deployment of the base station 100, the second interface 130 can be employed to establish a first contact with the OaM service center in order to download initial configuration data, in particular data to establish an OaM connection using the first interface 110, e.g. the IP address of first interface 110 of the RBS 100, Quality of Service (QoS) parameters, IP sec parameters and Virtual Local Area Network (VLAN) parameters. The configuration information to download can be retrieved based on or based on a number of parameters such as SIM information, and/or IMSI number of the UE 134, security certificates and Global Positioning System (GPS) position of the RBS 100. The parameters are provided by the RBS 100 to the OaM service center at initial contact.

Typically, this is provided as follows.

To start, RBS 100 establishes contact through the UE 134 310 with the core network 120 via the second interface 130 to another base station 150 using cell x of network X, in order to obtain a network address, e g an IP address, for the UE 134. The network address is assigned to the UE 134 in order to enable the UE 134 to be addressed and to communicate using Internet protocol (IP). Then RBS 100 establishes contact 320 with the OaM service center 225, e g an OaM server there, via the another base station 150 in cell x of network X, and supplies for instance SIM data for the UE 134, GPS position of RBS 100 etc to the OaM service center 225, e g to the OaM server. Then configuration data or other information is downloaded 330 from the OaM server 225. Typically, the configuration data is initial configuration data for setting up communication via the first interface 110, as mentioned above, but also other configuration data can be downloaded, using e.g. File TransFer Protocol (FTP) server for SW download. Also, at initial configuration, RBS identity is not known by the radio base station 100, but is supplied by the OaM server 225. Then RBS 100 establishes contact 340 with the OaM service center 225 via the first interface 110 using the downloaded configuration data. Then installation procedures are performed 350, or continued, typically via the first interface 110.

A great advantage with this embodiment is that it facilitates establishing configuration parameters for initial deployment of a base station without the need of a costly expert person for instance having knowledge of a complete installation process, but only a less experienced service person, to physically visit the base station for initial deployment.

An advantage of some of the embodiments presented herein is that they are simple to implement. According to some embodiments, only a software update of an existing base station without major HW manipulation is required to implement the embodiments. Accordingly the radio base stations may not require any new hardware except for a UE, and some SW. In addition, no new measurements are needed, which also facilitates implementation.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A base station for a cellular communication network, the base station comprising:
a first interface configured to communicate with a core network, including Operation and Maintenance, OaM, communication; and
a second interface configured for OaM communication, wherein the second interface is arranged to communicate wirelessly with the core network via another base station;
wherein the base station is arranged to download configuration parameters via the second interface for setting up OaM communication via the first interface.

2. The base station according to claim 1, wherein the second interface is arranged to communicate via radio with said another base station, wherein said another base station is part of the same cellular communication network (Y) as the base station and wherein said another base station has a radio coverage area (x) being overlaid a user equipment device, UE, arranged to communicate with to the base station.

3. The base station according to claim 1, wherein the second interface is arranged to communicate via radio with said another base station and wherein said another base station is part of another cellular communication network (X) than the base station, said another base station having a radio coverage area (x) overlaid the second interface.

4. The base station according to claim 1, wherein the second interface comprises a user equipment device, UE, for wireless communication with said another base station.

5. The base station according to claim 1, wherein the second interface is arranged to connect with a user equipment device, UE, external to the base station for wireless communication with said another base station via the user equipment device.

6. The base station according to claim 5, wherein the second interface comprises a port for receiving and communicating with the user equipment device, UE.

7. The base station according to claim 6, wherein the port comprises a power source for the user equipment device.

8. The base station according to claim 5, wherein the second interface is arranged to connect wirelessly with the user equipment device.

9. The base station according to claim 1, wherein the second interface is configured for communication with said another base station over a Uu interface of said another base station.

10. The base station according to claim 1, wherein the base station is arranged to detect OaM communication problems of the first interface and is arranged to switch OaM communication to the second interface in such case.

11. The base station according to claim 1, wherein the second interface is arranged to communicate with control circuitry for controlling the user equipment device, UE, to operate as a modem.

12. A method for Operation and Maintenance, OaM, communication in a base station comprised in a cellular communication network, said base station comprising a first interface configured to communicate with a core network, including OaM communication, wherein the method comprises:
establishing contact with the core network via a second interface configured for OaM communication, wherein the second interface is arranged to communicate with the core network wirelessly via another base station;
wherein the base station is arranged to download configuration parameters via the second interface for setting up OaM communication via the first interface.

13. The method according to claim 12, further comprising the steps of: detecting loss of communication via the first interface, and establishing contact with an OaM server via said another base station for supplying one or more of the following data to the OaM server: Subscriber Identification Module, SIM, data, Global Positioning System, GPS, position, Radio Base Station, RBS, identity.

14. The method according to claim 13, further comprising the steps of:
troubleshooting the loss of communication via the first interface,
establishing contact with the OaM server via the first interface,
performing OaM communication via the first interface.

15. The method according to claim 14, further comprising the steps of:

downloading from the OaM server via the second interface to the base station, configuration data as a result of the troubleshooting of the loss of communication via the first interface.

16. The method according to claim 14, further comprising the steps of:
- establishing contact with an OaM server via said another base station for supplying one or more of the following data to the OaM server: SIM data, GPS position,
- downloading initial configuration data to the base station,
- establishing contact with the OaM server via the first interface using the downloaded configuration data,
- performing installation procedures via the first interface.

* * * * *